July 10, 1973   S. E. ANDERSON ET AL   3,745,199
METHOD OF MAKING AN IMPROVED CASE-BONDED END-BURNING
PROPELLANT GRAIN WITH RESTRICTED STRESS-RELIEF PORTS
Filed Dec. 23, 1968

STANLEY E. ANDERSON
BERNARD L. THOMPSON
CHARLES E. THIES
THOMAS L. COST,
INVENTORS.

3,745,199
METHOD OF MAKING AN IMPROVED CASE-BONDED END-BURNING PROPELLANT GRAIN WITH RESTRICTED STRESS-RELIEF PORTS
Stanley E. Anderson, Huntsville, Bernard L. Thompson, Toney, and Charles E. Thies and Thomas L. Cost, Huntsville, Ala., assignors to the United States of America as represented by the Secretary of the Army
Filed Dec. 23, 1968, Ser. No. 786,492
Int. Cl. C06b 21/02
U.S. Cl. 264—3 R                   3 Claims

ABSTRACT OF THE DISCLOSURE

A method of making an improved case-bonded end-burning propellant grain with restricted stress-relief ports. The grain is divided into at least three segments by an internal perforation having the same number of radial arms, preferably equally spaced, with stress-relieving fillets or ports at each junction of the grain with the motor case. The method involves applying a restrictor over a release agent also applied to a mandrel (which mandrel later forms the perforation) and bonding the restrictor to the propellant during the casting and curing operation. The mandrel is then removed.

BACKGROUND OF THE INVENTION

This invention relates to a method of making an improved case-bonded end-burning propellant grain with restricted stress-relief fillets or ports.

End-burning propellant grains are traditionally made by cartridge-loading techniques. However, cartridge-loaded end-burning grains are susceptible to damage by rough handling and transportation and are expensive to fabricate. Case-bonding the grains gives a much more rugged unit, but adequate stress relief must be provided. A case-bonded grain has been made using a restricted stress relief port of the "boat-paddle" type, but this has not provided adequate stress relief for extreme temperatures. Moreover, the strain requirements placed on the restrictor are excessive. A method of making an improved case-bonded end-burning propellant grain with restricted stress-relief ports has long been sought after to greatly extend the environmental capability of case-bonded end-burning propellant grains.

The conventional rocket motor utilizing a case-bonded end-burning solid propellant grain comprises a thin-walled cylinder closed at one end and having a nozzle for emission of exhaust gases at the other end thereof. Propellants for use in such motors commonly comprise a combination fuel-binder made of a resin or elastomer and having incorporated therein an inorganic oxidizer. The propellant is ordinarily introduced into the rocket motor in a fluid or plastic state and cured or hardened therein. The motor is charged by positioning coaxially within the cylindrical casing of the motor an elongated core or mandrel that is provided with radial ribs and has an over-all diameter less than that of the rocket motor case. The lateral faces of each rib are commonly either parallel or converging with increasing distance from the axis. In the method of this invention, the mandrel is inserted in the rocket motor case either before or after it is charged with the fluid propellant. However, usually the mandrel is positioned in the rocket motor case first and the fluid propellant is then introduced into the space between the mandrel and case and solidified in place after which the mandrel is withdrawn to leave a central cavity (of a cross-section corresponding to that of the mandrel) extending through the center of the propellant grain. The inwardly extending radial ribs of propellants thus formed terminate in what is commonly called points, and the peripheral band of propellant adjacent the interior wall of the cylinder and between the bases of the points is called a web. The points are usually arranged symmetrically around the central cavity, and their number is varied according to the individual requirements of specific motors. The ratio of the thickness of the web to the radius of the propellant grain or charge is commonly called the web fraction.

Accordingly, it is the principal object of this invention to provide a method for making an improved case-bonded end-burning propellant grain with restricted stress-relief ports.

A particular object of this invention is to provide such a grain which will have adequate stress relief for extreme temperatures.

SUMMARY OF THE INVENTION

An improved case-bonded end-burning propellant grain with restricted stress-relief ports can be provided by dividing the grain into at least three segments by an internal perforation having the same number of radial arms, preferably equally spaced, and providing stress-relieving fillets or ports at each junction of the grain with the motor case. In order to prepare such a grain, a restrictor is applied over a release agent to a mandrel. The space occupied by the mandrel later becomes the perforation. The propellant is bonded to the restrictor during the casting operation. The mandrel with the release agent coated thereon is easily removed from the center of the propellant grain after the curing of the propellant grain is accomplished.

BRIEF DESCRIPTION OF THE DRAWING

These and other objects and attendant advantages of this invention will become more readily appreciated by reference to the following detailed description, when considered in conjunction with the accompanying drawing, which forms an integral part thereof.

In the drawing.

DESCRIPTION OF THE PREFERRED EMBODIMENT

Figure 1:
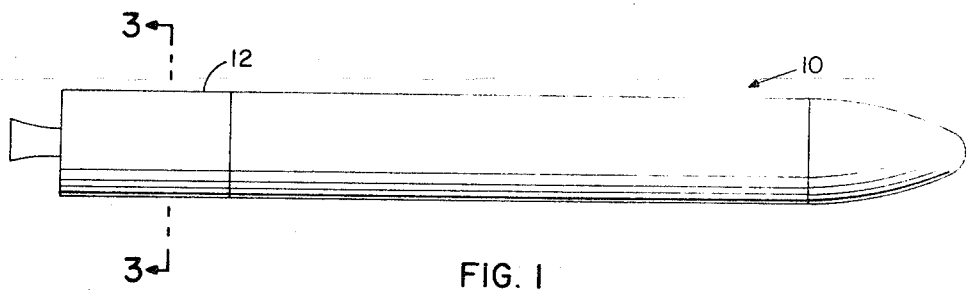
FIG. 1 is a view of a rocket having a rocket motor prepared in accordance with this invention therein.
Figure 2:
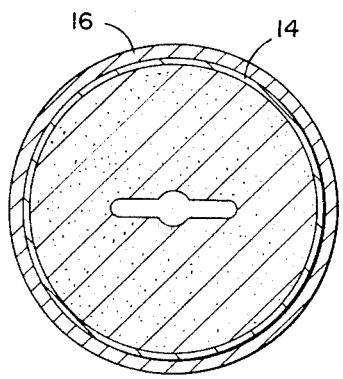
FIG. 2 is a cross-sectional view of a prior art propellant grain employing a "boat-paddle" port; and, FIG. 3 is a cross-sectional view of a propellant grain prepared in accordance with this invention taken along line 3—3 of FIG. 1.
Figure 3:
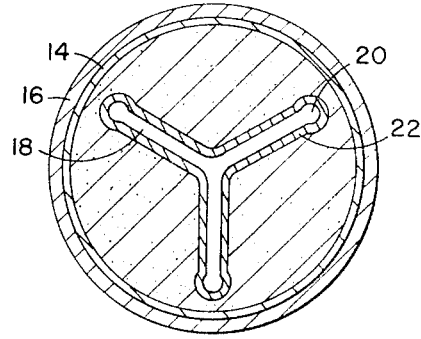

Referring to the drawing, FIG. 1 shows a rocket 10 having a rocket motor 12 therein. FIG. 2 shows a prior art propellant grain employing a "boat-paddle" port. It is shown attached to rocket motor insulation 14 attached to rocket motor case 16. The propellant grain prepared in accordance with this invention is shown in FIG. 3. It is substituted for the prior art propellant grain of FIG. 2 in the rocket motor 12 of FIG. 1.

Referring again to FIG. 3, the propellant grain made in accordance with this invention is divided into at least three (as in FIG. 3) segments by an internal perforation having the same number of radial arms 18, preferably equally spaced, with stress-relieving fillets or ports 20 at each junction of the grain with the rocket motor case. The fillets 20 at the tips of the arms 18 (or points) are tapered or rounded. If desired, the junctions of the radial arms with the central cavity can also be filleted to distribute local stresses. The propellant is bound at the outer edge thereof to the propellant insulation 14 which is bound to rocket motor case 16.

The mandrel (not shown) which is inserted at the center of rocket motor 12 prior to casting, forms a perforation along the longitudinal axis of the motor. Although this perforation is shown as having radial arms diene and 25 parts styrene, and also referred to as Buna-S. SBR is another acceptable designation for the referred to styrene-butadiene type rubber.

of essentially rectangular cross-section, the arms can also be star shaped or any of other desired configurations; however, when the mandrel is later removed, a perforation of the same configuration as the removed mandrel is left in the solid propellant grain.

The method of this invention involves applying a restrictor material 22 to form a restrictor over a release agent (not shown to the mandrel (which mandrel defines the shape of the perforation shown in FIG. 3) casting the propellant into the area between the restrictor material and the motor case, bonding the restrictor to the propellant during the casting and curing operation and thereby forming a propellant grain with a restrictor affixed thereto. The mandrel with the release agent coated thereon is removed at end of curing period. Usually the propellant is bound to propellant insulation 14 at the outer surface of the propellant grain. However, sometimes it is desirable not to employ insulation, in which case the propellant is bound directly to rocket motor case 16.

A liner or restrictor (restriction) 22 which is effectively bonded to the walls of the propellant grain prevents unwanted burning on the lined surfaces when the grain is exposed to flames and hot gases released during burning. The liner is a slower burning or nonburning material. The liner 22 should adhere closely to the walls of the propellant grain or charge, thereby preventing the flames and hot gases generated during combustion from reaching and igniting the surfaces of the propellant grain which are covered by the liner.

The release agent prevents the cast propellant from sticking to the mandrel. Examples of suitable release agents are various halogen-containing polymers such as polytetrafluoroetyhlene, commonly sold under the tradename Teflon. The use of these or other release agents which contain silicone resins are well known in the art.

The restrictor 22 can be made from any of the nonburning or slow burning materials used for this purpose in the art, such as cellulose acetate, ethylcellulose, butadiene-methylvinylpyridine copolymer, GR-S, natural rubber, and the like.

GR-S is an abbreviation for government rubber-styrene, produced by emulsion polymerization of 75 parts of butadiene and 25 parts styrene, and also referred to as Buna-S. SBR is another acceptable designation for the referred to styrene-butadiene type rubber.

Examples of propellant insulation are asbestos-filled epoxy or phenolic resins.

The soundness of this invention becomes apparent when one recognizes that prior art case-bonded solid propellants shrink away from the mandrel during polymerization of the polymerizable monomer to form the propellant grain and, since the propellant is constrained by the case-bonded at the motor wall, strains are set up which can be relieved only by cracking or by separation of the case from the wall.

Extensive thermal cycling of simulated rocket motors prepared in accordance with this invention showed that they could easily withstand extreme temperatuer environments. The rocket motor grain shown in FIG. 3 was selected for testing in actual rocket firings which proved that the concept of this invention is workable.

We claim:

1. The method of making a case-bonded end-burning propellant grain with restricted stress-relief ports comprising the steps of applying a release agent over a mandrel, said mandrel being disposed longitudinally in a rocket motor case and having at least three radially extending arms having fillets at the ends thereof, applying a restrictor material over said release agent, casting propellant into the area between said restrictor material and said motor case and curing said propellant and restrictor material to thereby bond said restrictor material to said propellant and form a propellant grain, and thereafter, removing said mandrel from said restrictor material.

2. The method of claim 1 wherein said propellant grain has a circumferentially disposed web around said fillets.

3. The method of claim 2 wherein said propellant is bonded to propellant insulation at the outer portion of said propellant grain.

References Cited
UNITED STATES PATENTS 3,118,380  1/1964  Damon et al. _____ 102—103

STEPHEN J. LECHERT, JR., Primary Examiner

U.S. Cl. X.R.

149—19; 102—103; 156— 242, 289